United States Patent
Hagar et al.

(10) Patent No.: US 11,074,222 B2
(45) Date of Patent: *Jul. 27, 2021

(54) LOCKLESS MANAGEMENT OF DEDUPLICATED DATA USING REFERENCE TAGS

(71) Applicant: International Business Machines Corporation, Armonk, NY (US)

(72) Inventors: Jason D. Hagar, Tucson, AZ (US); Michael G. Sisco, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 16/178,037

(22) Filed: Nov. 1, 2018

(65) Prior Publication Data

US 2019/0073375 A1 Mar. 7, 2019

Related U.S. Application Data

(63) Continuation of application No. 15/236,007, filed on Aug. 12, 2016, now Pat. No. 10,162,831.

(51) Int. Cl.
*G06F 16/174* (2019.01)
*G06F 16/11* (2019.01)
*G06F 16/16* (2019.01)

(52) U.S. Cl.
CPC ........ *G06F 16/1748* (2019.01); *G06F 16/125* (2019.01); *G06F 16/162* (2019.01)

(58) Field of Classification Search
CPC .......................... G06F 16/1748; G06F 16/125
See application file for complete search history.

(56) References Cited

U.S. PATENT DOCUMENTS

| | | |
|---|---|---|
| 8,041,907 B1 | 10/2011 | Wu et al. |
| 8,504,533 B2 | 8/2013 | Dewey et al. |
| 8,650,228 B2 | 2/2014 | Wideman et al. |
| 8,676,850 B2 | 3/2014 | Sisco et al. |
| 8,799,601 B1 | 8/2014 | Chen et al. |
| 8,898,107 B1 | 11/2014 | Floyd et al. |

(Continued)

FOREIGN PATENT DOCUMENTS

EP 2042995 A1 4/2009

OTHER PUBLICATIONS

He et al., "Data Deduplication Techniques," International Conference on Future Information Technology and Management Engineering, 2010, pp. 430-433.

(Continued)

*Primary Examiner* — Kris E Mackes
(74) *Attorney, Agent, or Firm* — Zilka-Kotab, P.C.

(57) ABSTRACT

In one embodiment, a method includes receiving a query related to a first data extent. The method also includes determining whether the first data extent is eligible for deletion based on a first sliding window time period equal to a predetermined retention period added to a predetermined deletion cushion in response to the query requesting a deletion operation for the first data extent. The method also includes determining whether the first data extent is eligible for linkage based on a second sliding window time period equal to the retention period less a predetermined linkage cushion in response to the query requesting a linkage operation for the first data extent. The linkage cushion includes less time than the deletion cushion.

20 Claims, 7 Drawing Sheets

(56) References Cited

U.S. PATENT DOCUMENTS

| | | |
|---|---|---|
| 9,405,481 B1 | 8/2016 | Cohen et al. |
| 9,804,934 B1 | 10/2017 | Natanzon et al. |
| 10,031,690 B1 | 7/2018 | Panidis et al. |
| 10,162,831 B2 | 12/2018 | Hagar et al. |
| 2010/0306283 A1 | 12/2010 | Johnson et al. |
| 2013/0036091 A1 | 2/2013 | Provenzano et al. |
| 2014/0156877 A1 | 6/2014 | Tylik et al. |
| 2015/0006475 A1 | 1/2015 | Guo et al. |
| 2017/0212915 A1 | 7/2017 | Borate et al. |
| 2018/0046640 A1 | 2/2018 | Hagar et al. |

OTHER PUBLICATIONS

Hagar et al., U.S. Appl. No. 15/236,007, filed Aug. 12, 2016.
Notice of Allowance from U.S. Appl. No. 15/236,007, dated Aug. 15, 2018.
List of IBM Patents or Patent Applications Treated as Related.

| Data Extent ID | Reference Count (RefCount) | Last Reference Date (LastRefDate) |
|---|---|---|
| 104238 | 4 | 7/15/2015 5:19:00 PM |
| 2179414 | 0 | 7/14/2015 1:23:15 PM |

FIG. 4

Figure 5:
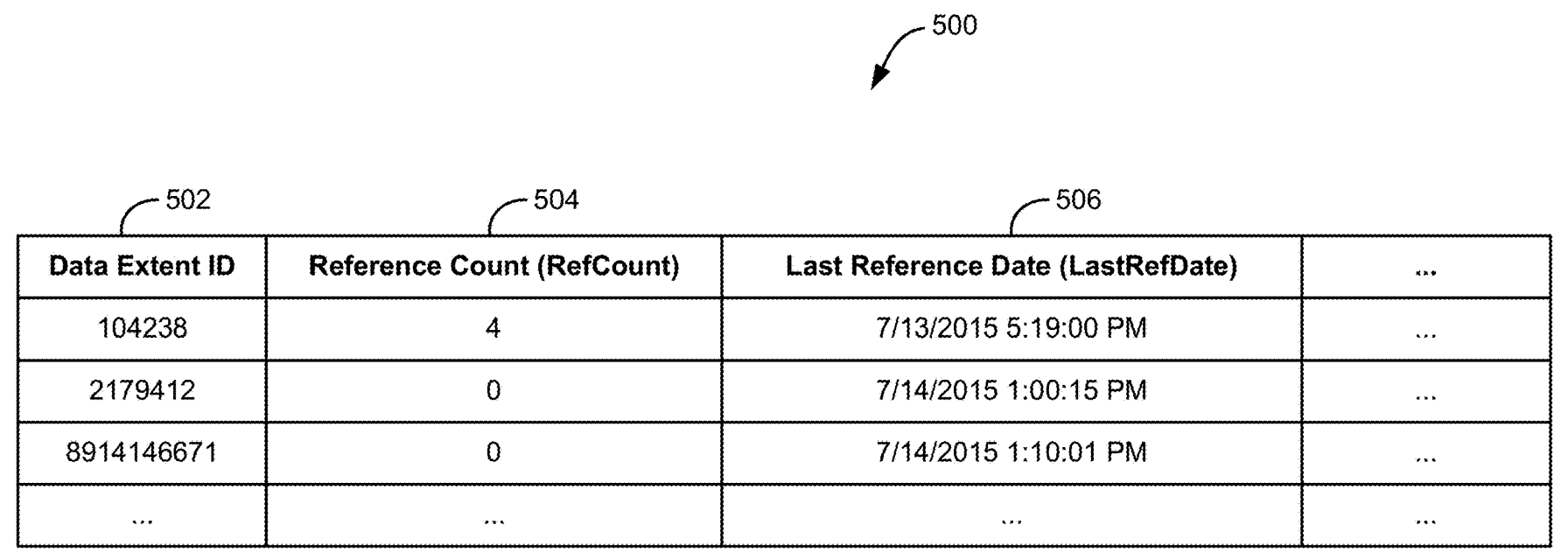

| Data Extent ID | Reference Count (RefCount) | Last Reference Date (LastRefDate) |
|---|---|---|
| 502 | 504 | 506 |
| 104238 | 4 | 7/13/2015 5:19:00 PM |
| 2179412 | 0 | 7/14/2015 1:00:15 PM |
| 8914146671 | 0 | 7/14/2015 1:10:01 PM |
| ... | ... | ... |

LOCKLESS MANAGEMENT OF DEDUPLICATED DATA USING REFERENCE TAGS

BACKGROUND

The present invention relates to managing data, and more specifically, to managing data via reference tags without using locks.

Data deduplication is a technique for eliminating redundant data in storage systems. In a deduplication process, chunks of data are identified and stored during a process of analysis, where the chunks of data comprise byte patterns. As the analysis continues, other chunks are compared to the stored chunks and whenever a match occurs, the redundant chunk is replaced with a reference that points to a matching stored chunk. In certain situations the same byte pattern may occur numerous times, and the amount of data to be stored may be greatly reduced by replacing redundant chunks with references that point to at least one unique chunk.

In deduplicated storage systems, there may be millions or even billions of data extents (chunks of data) that are stored and make up the system. Each data extent is unique, and in a highly deduplicated environment, there are many dependencies (links/references) to each of those data extents. Managing the linkage/deletion of unique data extents relies on traditional serialization mechanisms, such as locks/mutexes, to ensure that a particular data extent will stay resident once it has been found as a match for an incoming data extent.

In a high scale environment, there may be hundreds of sessions backing up data that is either broken down, or being broken down, into unique data extents and catalog queries performed on each data extent. Once a match is identified in the database, a corresponding row lock is typically obtained to ensure that no deletion is able to occur until the "linkage" is committed. Again, in a high scale environment, millions of matches are typically found and linkage operations occur. Using traditional serialization methods, such as locks, it is very expensive time-wise and resource-wise, and limits the amount of concurrent workload that may be processed. Additionally, the risk of deadlocks and hang-ups run high when two differing chunk management components compete against each other. One chunk management component includes deletions of data extents, no longer in-use, and the other chunk management component includes requests to link to that existing data extent.

As an example of lock list overhead, it is not unusual for a database management system to charge 128 bytes of memory per lock. In this example, 5 TB of data is being processed within a given backup window. If that 5 TB is broken down to 25 million data extents, using an average data extent size of 128K, it costs about 5 GB of memory just to handle the recordation of the locks. This does not include the processor cost of the database management system having to manage the lock list, including wait queues and so forth, that add additional processor demands. Any other typical serialization mechanism is going to have similar overhead and costs. However, there are no such mechanisms currently available.

SUMMARY

In one embodiment, a method includes receiving a query related to a first data extent. The method also includes determining whether the first data extent is eligible for deletion based on a first sliding window time period equal to a predetermined retention period added to a predetermined deletion cushion in response to the query requesting a deletion operation for the first data extent. The method also includes determining whether the first data extent is eligible for linkage based on a second sliding window time period equal to the retention period less a predetermined linkage cushion in response to the query requesting a linkage operation for the first data extent. The linkage cushion includes less time than the deletion cushion.

In another embodiment, a computer program product includes a computer readable storage medium having program instructions embodied therewith. The embodied program instructions are executable by a processing circuit to cause the processing circuit to receive a query related to a first data extent. The embodied program instructions further cause the processing circuit to determine whether the first data extent is eligible for deletion based on a first sliding window time period equal to a predetermined retention period added to a predetermined deletion cushion in response to the query requesting a deletion operation for the first data extent.

In yet another embodiment, a computer program product includes a computer readable storage medium having program instructions embodied therewith. The embodied program instructions are executable by a processing circuit to cause the processing circuit to receive a query related to a first data extent. The embodied program instructions further cause the processing circuit to determine whether the first data extent is eligible for linkage based on a sliding window time period equal to a predetermined retention period less a predetermined linkage cushion in response to the query requesting a linkage operation for the first data extent.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4 is an exemplary data extent catalog table that may be used in a deduplication engine, according to one embodiment.

FIG. 5 is an exemplary data extent catalog table that may be used in a deduplication engine, according to one embodiment.

DETAILED DESCRIPTION

Figure 1:
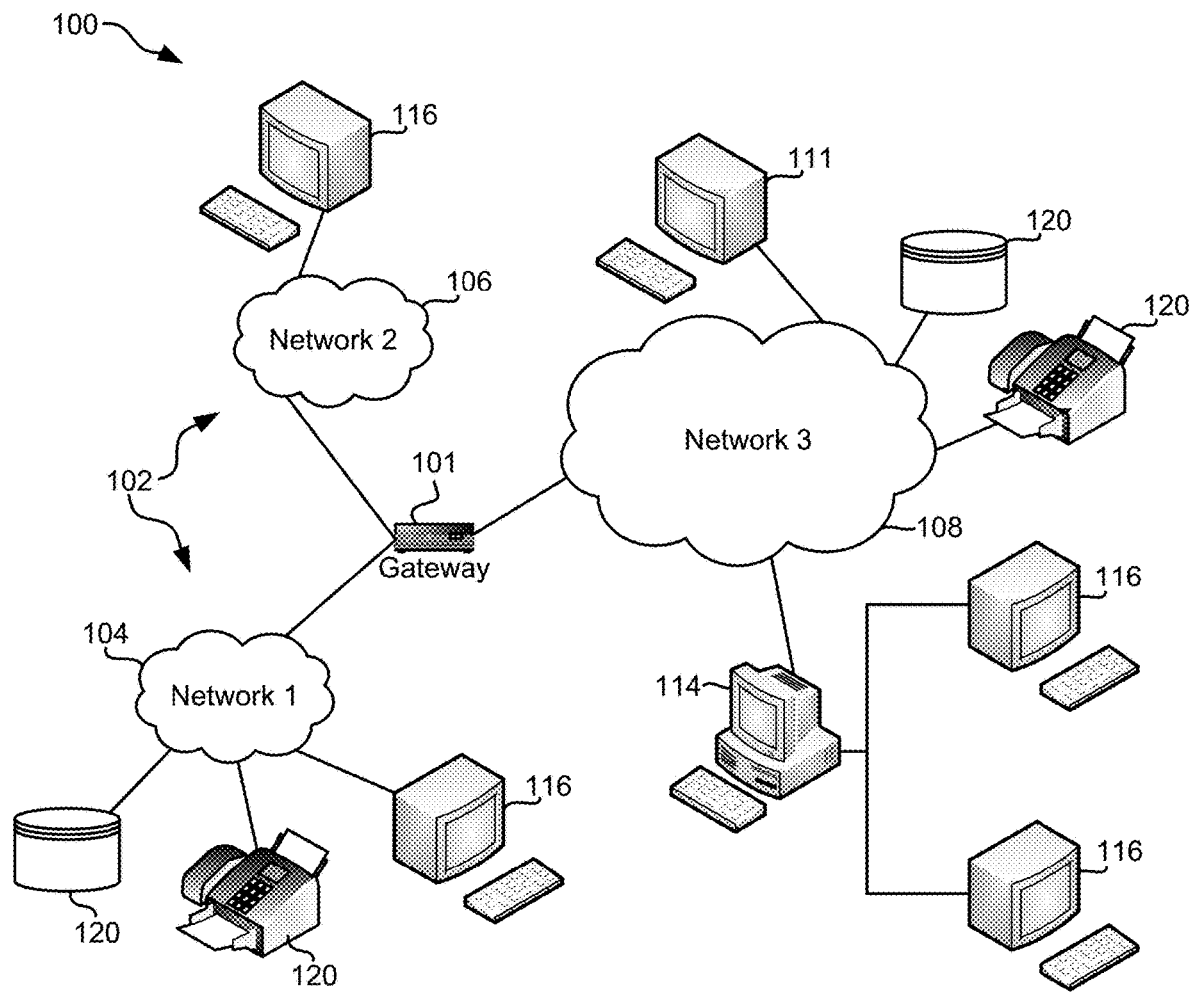
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about" ±10% of the value. For example, "about 10" indicates all values from and including 9.0 to 11.0.

The following description discloses several preferred embodiments of systems, methods, and computer program products for managing deduplicated data without traditional locking mechanisms.

Eliminating traditional serialization mechanisms from a data storage system is incredibly useful for data extent management where high scalability and high performance are desired within the data storage system. In embodiments described herein, reference tagging is used to manage data extents without the need for a locking mechanism. Consider a data storage system processing data from many clients simultaneously, as well as performing maintenance tasks in the background, activities that are invisible to those client systems. One background task is data extent deletion, and a second background task is housekeeping that takes place once data extents that are no longer referenced via an inventory are removed. These two background components are aware of each other and make decisions that maintain referential integrity, and avoid hard application failures when acting on a given data extent. Using reference counts and a last reference data, locking mechanisms may be avoided entirely.

In one general embodiment, a method includes receiving a query related to a first data extent. The method also includes determining whether the first data extent is eligible for deletion based on a first sliding window time period equal to a predetermined retention period added to a predetermined deletion cushion in response to the query requesting a deletion operation for the first data extent. The method also includes determining whether the first data extent is eligible for linkage based on a second sliding window time period equal to the retention period less a predetermined linkage cushion in response to the query requesting a linkage operation for the first data extent. The linkage cushion includes less time than the deletion cushion.

In another general embodiment, a computer program product includes a computer readable storage medium having program instructions embodied therewith. The embodied program instructions are executable by a processing circuit to cause the processing circuit to receive a query related to a first data extent. The embodied program instructions further cause the processing circuit to determine whether the first data extent is eligible for deletion based on a first sliding window time period equal to a predetermined retention period added to a predetermined deletion cushion in response to the query requesting a deletion operation for the first data extent.

In another general embodiment, a computer program product includes a computer readable storage medium having program instructions embodied therewith. The embodied program instructions are executable by a processing circuit to cause the processing circuit to receive a query related to a first data extent. The embodied program instructions further cause the processing circuit to determine whether the first data extent is eligible for linkage based on a sliding window time period equal to a predetermined retention period less a predetermined linkage cushion in response to the query requesting a linkage operation for the first data extent.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
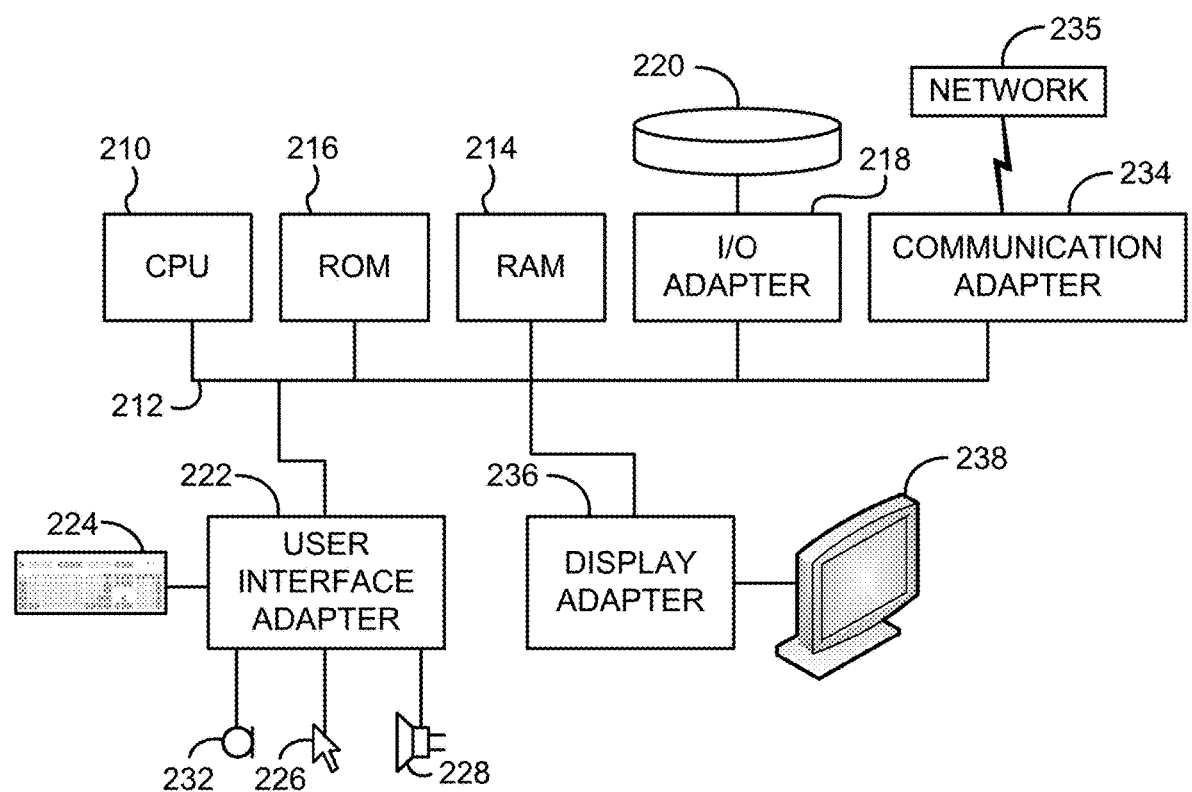
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
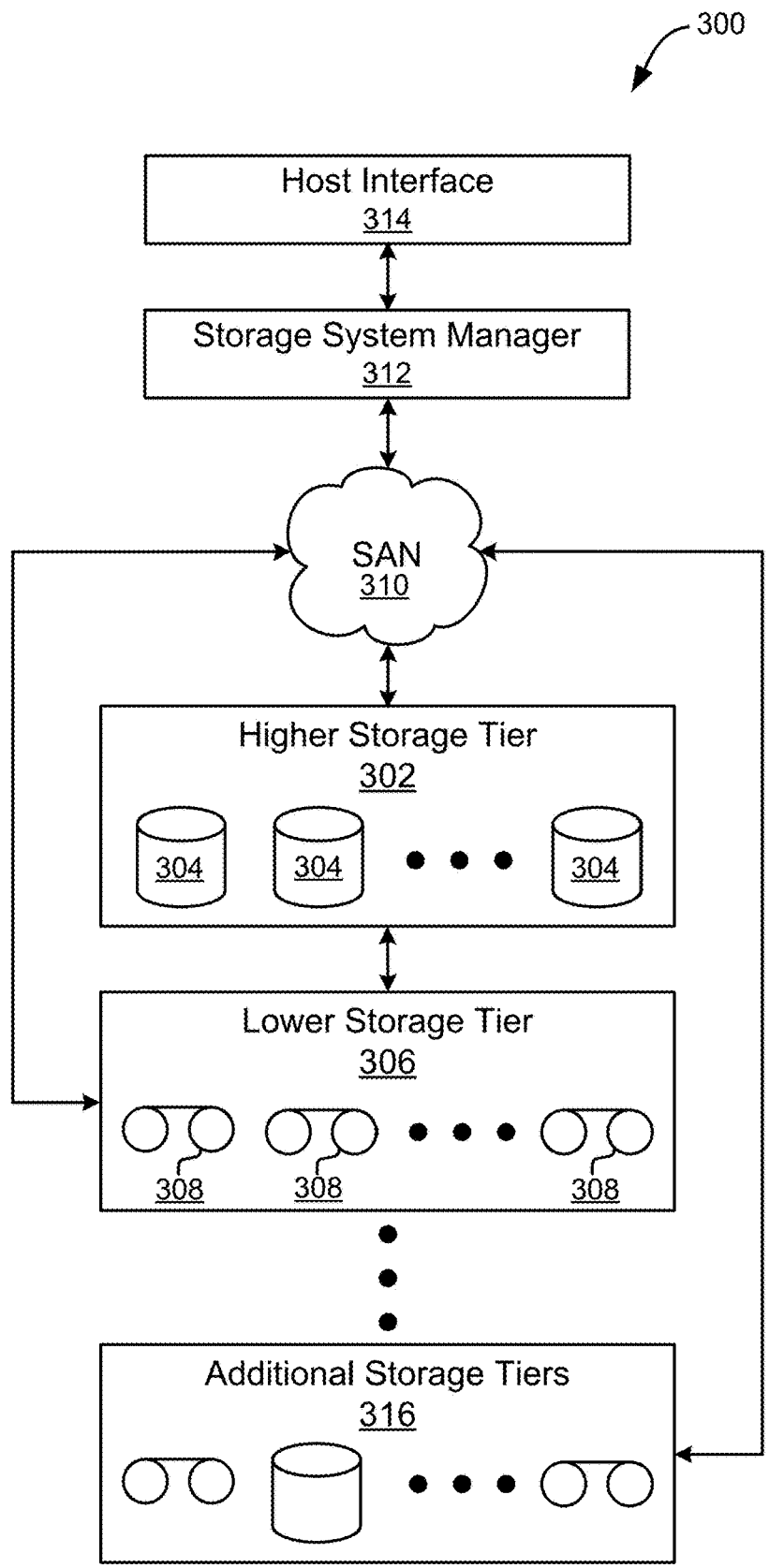
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

For effective implementation of any data management system, it is beneficial to have reference counts and last reference dates that are managed properly. FIG. 4 shows an exemplary data extent catalog table 400 that may be used in a deduplication engine, according to one embodiment.

Each data extent is recorded in the data extent catalog table 400 using a Data Extent Identifier (ID) 402, a name, or some other suitable identifying mark, and has a Reference Count (RefCount) 404 recorded in association with the Data Extent ID 402, along with a last reference date (LastRefDate) 406. The RefCount 404 is used to track a number of references that each data extent currently has to pointers in the database (other instances of the same data extent which point to the single stored copy of the data extent). The LastRefDate 406 is used to track the last time that the data extent was referenced by a pointer in the database in one approach, or the last time that a reference was deleted for a particular data extent according to another approach, or the last time that the data extent was queried in the data extent catalog table 400, in another approach. The latter methods typically create more recent LastRefDates for data extents in the database in comparison with the former method, because activity for a data extent may take place that is not only referencing the data extent, but may also be removing a reference, or simply looking up the data extent.

Once a data extent in the data extent catalog table 400 has zero references as indicated by the RefCount 404, and a LastRefDate 406 that is later than a retention period, the deletion engine attempts to remove this data extent from the deduplication data storage system. For example, if the retention period is 24 hours, and the current date and time is Jul. 15, 2015 6:30:00 PM, data extent #2179414 would be deleted from the deduplication data storage system upon request because it has a RefCount 404 of zero and it's LastRefDate 406 is more than 24 hours ago, according to conventional techniques.

Without a locking mechanism in place, a problem occurs where, if a data extent is being stored in the deduplication data storage system at the same time that the data extent deletion operation is running, a linkage operation for the newly stored data extent may result in a reference (pointer) to a data extent that has been purged from the data storage system due to the deletion operation (which had not completed prior to the linkage request). A loss of data integrity may result from such an action unless other protections are built into the deduplication data storage system and these other protections may be very costly time- and resource-wise. Another potential issue which occurs more commonly is that the linkage operation may attempt to commit its reference to the database and receive a failure since the row attempting to be referenced no longer exists in response to the deletion operation completing.

In order to overcome these problems with conventional deduplication data storage systems, according to one embodiment, a first criterion is introduced that is delineated when a data extent is eligible for reuse, and a second criterion is introduced that is delineated when a data extent becomes eligible for deletion. By making these two criteria separate, but related, the deduplication data storage system is able to guarantee that the data extent deletion thread will never delete a data extent that is in the process of being referenced.

A data extent is eligible for reuse whenever it is stored in the deduplication data storage system and has not exceeded the retention time period. This retention time period, in one embodiment, is adjustable, and may be based on a plurality of factors, such as session timing to complete a linkage request, delays in transmission links between a requester system or client and the server maintaining the database, the type of operation requested (deletion versus linkage), etc. This is referred to herein as a "sliding window" time period that is associated to the data extent reference tagging. The criteria discussed above form the basis for the sliding window time period which has a different value of time depending on the operation request (deletion versus linkage).

A data extent is eligible for deletion when it has zero references pointing to it and has exceeded a sum of the retention time period and a time cushion. This time cushion allows for distributed deduplication, whereby client systems deduplicate data before sending the data to the deduplication data storage system for final storage. In such a system, the client knows that the server is storing a given data extent, and may do so completely separately from the connection upon which it stores the data.

The reference tag is used to designate a data extent's last activity and act as a basis for a sliding window time period that allows for a lockless approach to be used for management of data extents in a deduplication data storage system. This sliding window time period is based off of time cushions to hide potential candidates from the deduplication engine when the window to act is very close to being closed (e.g., close to the end of the retention time period). During the time very close to the retention time period closing, a data extent might be removed from the deduplication data storage system while other operations are being processed. On the other side, the time cushion may be used to hide data extents eligible for deletion for the amount of time in the time cushion after the data extents are technically eligible for deletion/removal based on their last referenced date. One factor in determining the time cushion, and subsequently the span of the sliding window time period, is to gauge an amount of time that a storage operation and an amount of time that housekeeping operations will take in order to find an average (and possibly optimal) value for the particular environment in which the deduplication data storage system operates.

In the following examples, it is assumed that the indicated values are used for the retention time period and the time cushion. Moreover, it is preferred that the last referenced date is updated whenever a data extent is referenced through either a linkage operation (formation of a new reference tag) or a deletion operation (removal of a reference tag). The retention time period is assumed to be 1440 minutes (e.g., REUSEDELAY=1440 MIN), the query time cushion is assumed to be 20 minutes (e.g., QUERYCUSHION=20 MIN), the linkage time cushion is assumed to be 5 minutes (e.g., LINKAGECUSHION=5 MIN), and the deletion cushion is assumed to be four times the linkage time cushion (e.g., DELETIONCUSHION=LINKAGECUSHION*4).

On the ingest side of the deduplication engine, for each data extent discovered in the deduplication data storage system, the following actions may be performed: 1) identify whether the data extent has a reference count of greater than zero (e.g., RefCount>0); 2) If RefCount>0, a reference request for this data extent is safe to perform and a reference may be granted for this data extent, and the duplicated data may be purged; 3) If RefCount=0, the last reference date check (CheckDate) is adjusted based on the data extent reuse sliding window time period as described below.

The data extent reuse sliding window time period is equal to the difference between REUSEDELAY and QUERYCUSHION (e.g., REUSEDELAY−QUERYCUSHION) when the data extent has not been marked for removal (is subject to query only). Otherwise, the data extent reuse sliding window time period is equal to the sum of REUSEDELAY and LINKAGECUSHION (e.g., REUSEDELAY+LINKAGECUSHION). For query only, the data extent reuse sliding window time period is equal to 1440 min−20 min=1420 min. For all other situations, the data extent reuse sliding window time period is equal to 1440 min+5 min=1445 min. Therefore, the data extent reuse sliding window time period exists from 1420 min to 1445 min, a "window" of 25 min, that slides to continually track the parameters and conditions of the system for this particular data extent.

Once the data extent reuse sliding window time period is calculated, it is determined whether the data extent's last use date (LastRefDate) falls within this reuse window. When the LastRefDate is greater than the CheckDate (e.g., LastRefDate>CheckDate), then the data extent is discarded and replaced by a reference pointer to the found data extent. In another approach, a query operation may simply be notified that there is a matching data extent stored in the system. However, if the LastRefDate is less than the CheckDate (e.g., LastRefDate<CheckDate), then the data extent is stored as a new data extent in the system. In another approach, the query operation is simply notified that there is no matching data extent stored to the system.

On the deletion side of the deduplication engine (the housekeeping side), for each data extent discovered in the deduplication data storage system having a RefCount of zero (e.g., RefCount=0), the last reference date check is adjusted based on the data extent reuse sliding window time period (e.g., CheckDate=REUSEDELAY+DELETIONCUSHION). Moreover, the CheckDate is calculated as the difference between the current time and the DELETIONCUSHION (e.g., NOW−DELETIONCUSHION). In this example, CheckDate equals −1460 min from the current time. Then, the last use date (LastRefDate) for the data extent is compared to the reuse sliding window time period (CheckDate). When LastRefDate<CheckDate, the data extent is purged from the system. Otherwise, processing of the data extent is skipped and left alone for the next analysis run.

Using this mechanism for ingest and deletion of data extents using reference tags, the different amounts of time that associated operations take is accounted for in the sliding window time period. Thus, these two separate threads adjust for this difference in time, but coordinate their adjustments so that data extent reuse (reference tagging) does not happen simultaneously to data extent deletion.

Moreover, greater care is taken when a remote client is performing deduplication and querying the server. This greater care manifests in the form of more conservative cushions for the amount of time that is needed for the operations to take place, and thus greater querying and deletion cushions for remote client access. The more conservative cushions may be based, in one embodiment, on past history of client session times for this particular client. It is better to report that a data extent is not present when it is (which results in a duplicated data extent for a period of time) than to delete a data extent and its target that is attempting to be referenced (which results in the data being lost). Also, when the deduplication operation is performed on the system, more data extents may be reused because the timing will be closer to the edge of the reuse sliding window time period. The stated reuse sliding window time period is not a guarantee of when a given data extent will be deleted, but is instead a guarantee of when a given data extent will not be deleted. Moreover, when a data extent is purged, it is not truly deleted from the system and may be recovered if needed as long as it is not overwritten.

Using the sliding window time period and reference tagging described herein in various embodiments, no locks need to be taken out, and a separate application or operating system routine does not need to be invoked for each data extent that is to be deleted. Furthermore, locks do not need to be taken out when attempting to reuse a data extent. Moreover, the database that stores the data extents does not need to be marked in any way, which would also incur a time penalty and resource penalty. Therefore, most efficient reuse of data extents and deletion of data extents is assured, with data integrity maintained.

Now referring to FIG. 5, an example of reference tagging and the use of the sliding window time period is provided. FIG. 5 shows a data extent catalog table 500 along with the Data Extent ID 502, RefCount 504, and LastRefDate 506 for three data extents. Of course, millions or billions of data extents may be listed in a data extent catalog table 500 in actual implementation within a deduplication data storage system. However, the search time for these expansive tables is still on the order of approximately 1 ms, which ensures negligible time penalty for searching the table.

Moreover, each record or entry in a data extent catalog table 500 may include more information than just the Data Extent ID 502, RefCount 504, and LastRefDate 506. For example, other information may be stored to the data extent catalog table 500 such as storage location, size, indication of whether the data extent is compressed or not, etc. Using this data extent catalog table 500 along with reference tagging, the sliding window time periods may be controlled such that the deduplication component will have access to a first subset of the data extents in the data extent catalog table 500 at any given time, while the housekeeping (deletion) component will have access to a second subset of the data extents in the data extent catalog table 500 at the given time.

For the sake of these descriptions of tagged data extent management using reference counting and last use date, the reuse window is 24 hours from last use date, the reuse cushion is 5 min, and the deletion cushion is 20 min. In this example, assuming that the current date and time is Jul. 15, 2015 at 1:10:30 PM, when a linking operation is performed against Data Extent ID #2179412, the table as viewed by the deduplication engine will include a subset of entries that includes those entries which have a LastRefDate of less than 24 hours and 5 minutes ago, including Data Extent ID #8914146671, but not Data Extent ID #2179412 and Data Extent ID #104238 because their LastRefDate is greater than 24:05:00 ago.

As the current date and time is updated, more data extents will lose eligibility for linkage as their last reference date slips out of the sliding window time period of 24 hours and 5 minutes ago or less, in these examples. Moreover, some data extents will have their eligibility for linkage replaced as their last reference date is updated to reflect recent activity and therefore no longer falls outside of the sliding window time period.

Should a deletion operation be performed for Data Extent ID #2179412, the table as viewed by the deduplication engine will include a subset of entries that includes those entries which have a LastRefDate of greater than 24 hours and 20 minutes ago. In this example, assuming that the current date and time is Jul. 15, 2015 at 1:20:30 PM, the subset of entries includes those entries which have a LastRefDate of greater than 24 hours and 20 minutes ago, including Data Extent ID #104238 and Data Extent ID #2179412 because their LastRefDate is greater than 24:20:00 ago. Therefore, in this example, the deduplication engine would purge Data Extent ID #2179412 during the deletion operation. However, the deduplication engine would not have visibility to Data Extent ID #8914146671, and therefore this data extent is not eligible for deletion.

As the current date and time is updated, more data extents will become eligible for deletion as their last reference date slips into the sliding window time period of 24 hours and 20 minutes ago or longer, in these examples. Moreover, some data extents will be removed from eligibility as their last reference date is updated to reflect recent activity and therefore no longer fall within the sliding window time period.

Figure 6:
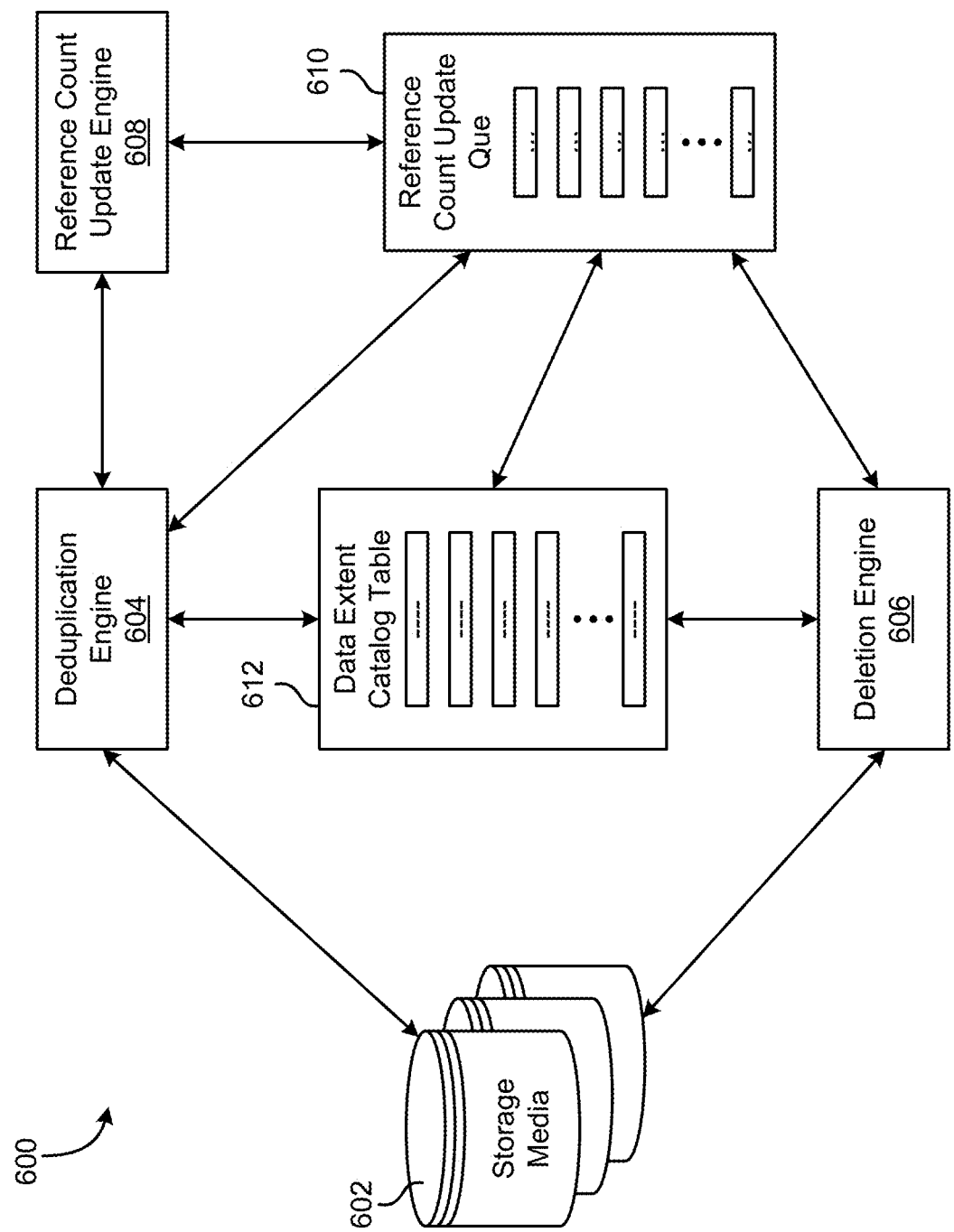
FIG. 6 shows a system according to one embodiment.

Now referring to FIG. 6, a block diagram of a deduplication data storage system 600 is shown according to one embodiment. The deduplication data storage system 600 may include one or more storage media 602 each of which may store a plurality of data extents, a deduplication engine 604, a deletion engine 606, and a data extent catalog table 612. The data extent catalog table 612 may include location information for each data extent stored to the storage media 602, data extent IDs for each data extent, reference counts for each data extent, and last reference dates for each data extent. Other information may also be included in the data extent catalog table 612 as discussed in more detail previously, in more approaches.

The deduplication engine 604 is configured to manage deduplication operations (linkage operations) for all data extents stored in the storage media 602, in one embodiment, including creating reference tags for a data extent, and creating pointers to existing data extents when a matching data extent is found to already be stored to the storage media 602. Moreover, the deduplication engine 604 utilizes the sliding window time period, which includes a linkage cushion, in order to analyze the last reference dates in the data extent catalog table 612 in making these deduplication decisions for any particular data extent.

The deletion engine 606 is configured to manage deletion operations (purge or housekeeping operations) for all data extents stored in the storage media 602, in one embodiment, including purging data extents stored to the storage media 602 that are found to have no references thereto after a predetermined deletion waiting period. Moreover, the deletion engine 606 utilizes the sliding window time period, which includes a deletion cushion, in order to analyze the last reference dates in the data extent catalog table 612 in making these deletion decisions for any particular data extent.

In one embodiment, when a data extent has no references thereto, but is not within the sliding window time period for deletion, the deletion engine 606 may note this data extent and revisit it again in a more appropriate time when it is anticipated to be available for deletion. Then, another check is made as to the last reference date, and the data extent is purged if appropriate.

The deduplication data storage system 600 may also include, in some embodiments, a reference count update engine 608 that is configured to update the reference counts for each data extent recorded in the data extent catalog table 612 via the reference count update que 610. As the entries in the data extent catalog table 612 need updating due to additional or less references being made to the data extent, the reference count update engine 608 inserts a new request in the reference count update que 610 to update the entry in the data extent catalog table 612 to reflect the current reference count for any particular data extent stored to the storage media 602. Since this process may take some time to complete, the time cushions (linkage cushion and deletion cushion) employed in the sliding window time period are set to account for the delay in processing the reference count updates to reflect the actual reference count for any particular data extent.

In one embodiment, the storage media 602 may be located remotely from the deduplication engine 604, the deletion engine 606, and/or the reference count update engine 608, may be accessible in some embodiments via a remote network. In another embodiment, any of the various engines may be combined into a single hardware component configured to perform all of the various functions of the individual engines. These one or more hardware components may include a local server, a cloud or remote server, a mainframe computer, a host, a processing circuit having one or more processors therein, or some other device having one or more processors therein. The processing circuit, e.g., processor(s), chip(s), and/or module(s) implemented in hardware and/or software, and preferably having at least one hardware component, may be utilized in any of the various engines. Illustrative processors include, but are not limited to, a CPU, an ASIC, a FPGA, etc., combinations thereof, or any other suitable computing device known in the art.

Figure 7:
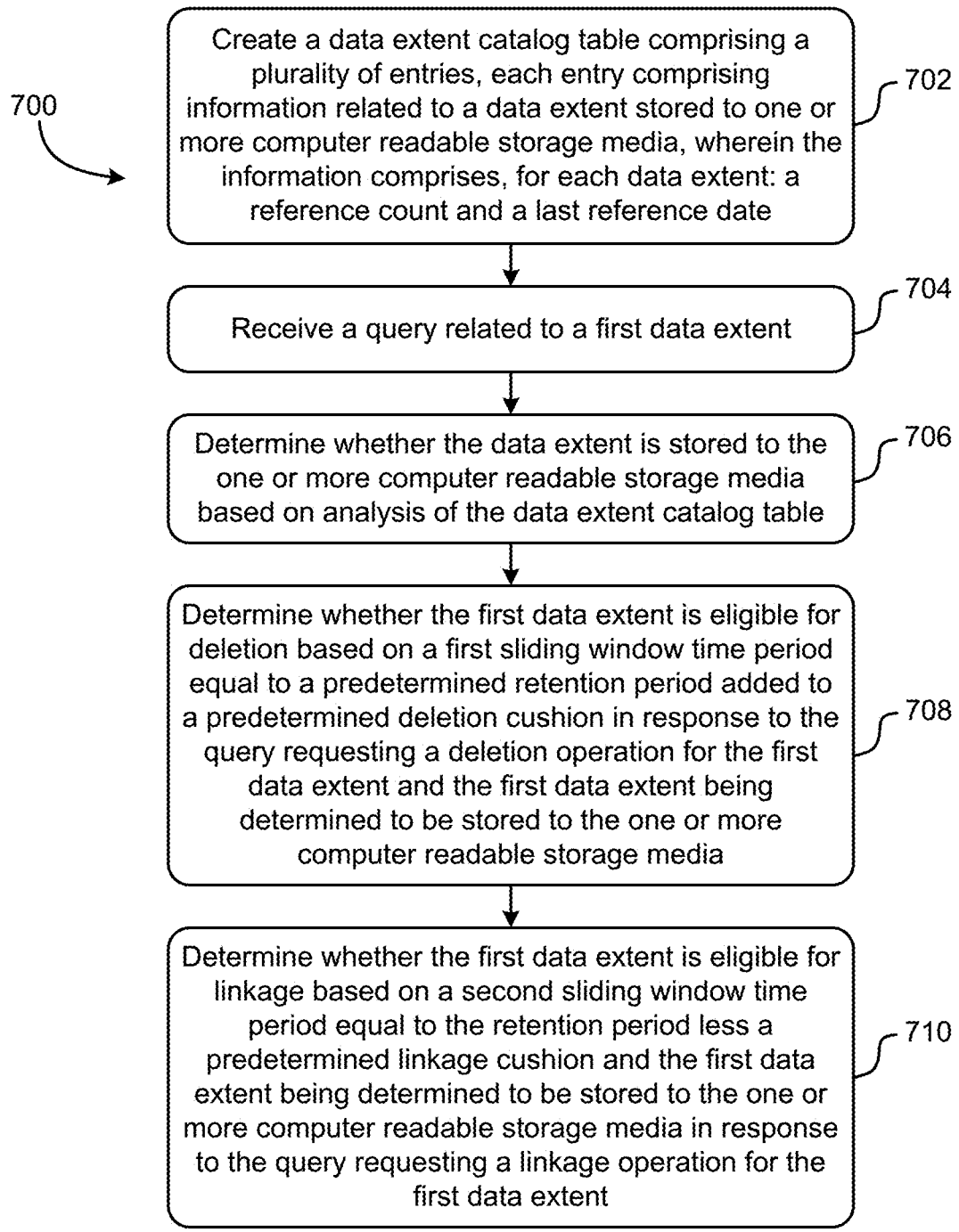
FIG. 7 shows a flowchart of a method, according to one embodiment.

Now referring to FIG. 7, a method 700 is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a cloud server, a mainframe computer, a host, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 700. Illustrative processors include, but are not limited to, a CPU, an ASIC, a FPGA, etc., combinations thereof, or any other suitable computing device known in the art.

As shown in FIG. 7, method 700 may start with optional operation 702, where a data extent catalog table is created. In an alternate embodiment, this data extent catalog table may already exist in the deduplication data storage system, and therefore operation 702 may not be necessary, at least in the context of method 700. The data extent catalog table comprises a plurality of entries, each entry including information related to a data extent stored to one or more computer readable storage media. The one or more computer readable storage media are accessible by a processor executing method 700, but is not necessarily local to the processor, and may be located remotely from the processor. The information stored for each data extent includes: a reference count and a last reference date.

In addition, the information may include a data extent ID #, location information, compressed information, size information, etc.

In operation 704, a query related to a first data extent is received. The query may be of at least two types: a deletion query that requests a deletion operation to be performed by a deduplication engine, or a linkage query that requests a linkage operation to be performed by the deduplication engine. In more embodiments, the query may simply be directed toward ascertaining whether the data extent referenced by the query exists in the deduplication data storage system.

In operation 706, it is determined whether the data extent is stored to the one or more computer readable storage media based on analysis of the data extent catalog table. This may include searching the data extent catalog table for a data extent ID that matches that assigned to the first data extent. Moreover, a hash of certain parameters may be calculated, and this hash value may be compared against entries in the data extent catalog table which may store such hash values correlated to the data extents having information stored therein. Other techniques of searching the data extent catalog table may also be employed as would be understood by one of skill in the art upon reading the present descriptions.

In operation 708, it is determined whether the first data extent is eligible for deletion based on a first sliding window time period equal to a predetermined retention period added to a predetermined deletion cushion. This determination is made in response to the query requesting a deletion operation for the first data extent and the first data extent being determined to be stored to the one or more computer readable storage media.

In operation 710, it is determined whether the first data extent is eligible for linkage based on a second sliding window time period equal to the retention period less a predetermined linkage cushion and the first data extent being determined to be stored to the one or more computer readable storage media. This determination is made in response to the query requesting a linkage operation for the first data extent.

In most embodiments of method 700, the linkage cushion includes less time than the deletion cushion.

According to a further embodiment, method 700 may include deleting the first data extent in response to a reference count for the first data extent being zero and a last reference date for the first data extent being longer ago than a current date and time less the first sliding window time period. Moreover, in this embodiment, method 700 also includes maintaining the first data extent in response to the last reference date for the first data extent being equal or less than the current date and time less the first sliding window time period or the reference count for the first data extent being greater than zero.

In yet another embodiment, method 700 may further include linking the first data extent to a new pointer in response to a last reference date for the first data extent being as recent as a current date and time less the second sliding window time period. Moreover, method 700 may include storing the first data extent in response to a reference count for the first data extent being zero and the last reference date for the first data extent being longer ago than the current date and time less the second sliding window time period.

According to one approach, the linkage cushion and the deletion cushion are based in part on historical time lengths of sessions directed toward accessing data extents stored to a computer readable storage medium on which the first data extent is stored. In this way, it is ensured that a data extent being deleted is not linked to and then purged from the system.

According to another approach, the deletion cushion is set to a minimum amount of time necessary to ensure that any outstanding linkage operations in a reference count update que for a particular data extent are completed. Because it takes a certain amount of time for a linkage operation to progress through the que, this time is accounted for in the deletion cushion to ensure extents currently being linked to are not deleted.

In a further embodiment, outstanding linkage operations may be stored to a reference count update que for processing in a first-in first-out (FIFO) arrangement.

According to another embodiment, the reference count may track a number of current reference pointers for a particular data extent, and the last reference date may track a last date and time in which the particular data extent was queried, linked to, or deleted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, the method comprising:
   receiving a query related to a first data extent;
   determining whether the first data extent is eligible for deletion based on a first sliding window time period equal to a predetermined retention period added to a predetermined deletion cushion in response to the query requesting a deletion operation for the first data extent; and
   determining whether the first data extent is eligible for linkage based on a second sliding window time period equal to the retention period less a predetermined linkage cushion in response to the query requesting a linkage operation for the first data extent,
   wherein the linkage cushion includes less time than the deletion cushion.

2. The method as recited in claim 1, comprising:
   deleting the first data extent in response to a reference count for the first data extent being zero and a last reference date for the first data extent being longer ago than a current date and time less the first sliding window time period; and
   maintaining the first data extent in response to the last reference date for the first data extent being equal or less than the current date and time less the first sliding window time period or the reference count for the first data extent being greater than zero.

3. The method as recited in claim 1, comprising:
   linking the first data extent to a new pointer in response to a last reference date for the first data extent being as recent as a current date and time less the second sliding window time period; and
   storing the first data extent in response to a reference count for the first data extent being zero and the last reference date for the first data extent being longer ago than the current date and time less the second sliding window time period.

4. The method as recited in claim 1, wherein the linkage cushion and the deletion cushion are based in part on historical time lengths of sessions directed toward accessing data extents stored to a computer readable storage medium on which the first data extent is stored.

5. The method as recited in claim 1, wherein the deletion cushion is set to a minimum amount of time necessary to ensure that any outstanding linkage operations in a reference count update que for a particular data extent are completed.

6. The method as recited in claim 1, wherein outstanding linkage operations are stored to a reference count update que for processing in a first-in first-out (FIFO) arrangement, and wherein the reference count tracks a number of current reference pointers for a particular data extent, and wherein a last reference date tracks a last date and time in which the particular data extent was queried.

7. A computer program product, the computer program product comprising a computer readable storage medium having program instructions embodied therewith, the embodied program instructions being executable by a processing circuit to cause the processing circuit to:

receive, by the processing circuit, a query related to a first data extent; and determine, by the processing circuit, whether the first data extent is eligible for deletion based on a first sliding window time period equal to a predetermined retention period added to a predetermined deletion cushion in response to the query requesting a deletion operation for the first data extent.

8. The computer program product as recited in claim 7, wherein the embodied program instructions are further executable by the processing circuit to cause the processing circuit to:

determine, by the processing circuit, whether the first data extent is eligible for linkage based on a second sliding window time period equal to the retention period less a predetermined linkage cushion in response to the query requesting a linkage operation for the first data extent, wherein the linkage cushion includes less time than the deletion cushion.

9. The computer program product as recited in claim 8, wherein the embodied program instructions are further executable by the processing circuit to cause the processing circuit to:

link, by the processing circuit, the first data extent to a new pointer in response to a last reference date for the first data extent being as recent as a current date and time less the second sliding window time period; and store, by the processing circuit, the first data extent in response to a reference count for the first data extent being zero and the last reference date for the first data extent being longer ago than the current date and time less the second sliding window time period.

10. The computer program product as recited in claim 9, wherein the reference count tracks a number of current reference pointers for a particular data extent, and wherein a last reference date tracks a last date and time in which the particular data extent was queried.

11. The computer program product as recited in claim 8, wherein the linkage cushion and the deletion cushion are based in part on historical time lengths of sessions directed toward accessing data extents stored to a computer readable storage medium on which the first data extent is stored.

12. The computer program product as recited in claim 8, wherein the deletion cushion is set to a minimum amount of time necessary to ensure that any outstanding linkage operations in a reference count update que for a particular data extent are completed.

13. The computer program product as recited in claim 7, wherein the embodied program instructions are further executable by the processing circuit to cause the processing circuit to:

delete, by the processing circuit, the first data extent in response to a reference count for the first data extent being zero and a last reference date for the first data extent being longer ago than a current date and time less the first sliding window time period; and maintain, by the processing circuit, the first data extent in response to the last reference date for the first data extent being equal or less than the current date and time less the first sliding window time period or the reference count for the first data extent being greater than zero.

14. A computer program product, the computer program product comprising a computer readable storage medium having program instructions embodied therewith, the embodied program instructions being executable by a processing circuit to cause the processing circuit to:

receive, by the processing circuit, a query related to a first data extent; and determine, by the processing circuit, whether the first data extent is eligible for linkage based on a sliding window time period equal to a predetermined retention period less a predetermined linkage cushion in response to the query requesting a linkage operation for the first data extent.

15. The computer program product as recited in claim 14, wherein the embodied program instructions are further executable by the processing circuit to cause the processing circuit to:

determine, by the processing circuit, whether the first data extent is eligible for deletion based on a second sliding window time period equal the retention period added to a predetermined deletion cushion in response to the query requesting a deletion operation for the first data extent, wherein the linkage cushion includes less time than the deletion cushion.

16. The computer program product as recited in claim 15, wherein the linkage cushion and the deletion cushion are based in part on historical time lengths of sessions directed toward accessing data extents stored to a computer readable storage medium on which the first data extent is stored.

17. The computer program product as recited in claim 15, wherein the embodied program instructions are further executable by the processing circuit to cause the processing circuit to:

delete, by the processing circuit, the first data extent in response to a reference count for the first data extent being zero and a last reference date for the first data extent being longer ago than a current date and time less the second sliding window time period; and maintain, by the processing circuit, the first data extent in response to the last reference date for the first data extent being equal or less than the current date and time less the second sliding window time period or the reference count for the first data extent being greater than zero.

18. The computer program product as recited in claim 17, wherein the reference count tracks a number of current reference pointers for a particular data extent, and wherein a last reference date tracks a last date and time in which the particular data extent was queried.

19. The computer program product as recited in claim 14, wherein the embodied program instructions are further executable by the processing circuit to cause the processing circuit to:

link, by the processing circuit, the first data extent to a new pointer in response to a last reference date for the first data extent being as recent as a current date and time less the sliding window time period; and store, by the processing circuit, the first data extent in response to a reference count for the first data extent being zero and the last reference date for the first data extent being longer ago than the current date and time less the sliding window time period.

20. The computer program product as recited in claim 14, wherein outstanding linkage operations are stored to a reference count update que for processing in a first-in first-out (FIFO) arrangement.

* * * * *